US009599077B2

(12) United States Patent
Jensen

(10) Patent No.: US 9,599,077 B2
(45) Date of Patent: Mar. 21, 2017

(54) FILTER ELEMENT WITH UNDULATING SEAL

(71) Applicant: Parker-Hannifin Corporation, Cleveland, OH (US)

(72) Inventor: Russell D. Jensen, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 322 days.

(21) Appl. No.: 14/509,812

(22) Filed: Oct. 8, 2014

(65) Prior Publication Data

US 2015/0096931 A1    Apr. 9, 2015

Related U.S. Application Data

(60) Provisional application No. 61/888,302, filed on Oct. 8, 2013.

(51) Int. Cl.
| | |
|---|---|
| *F02M 37/22* | (2006.01) |
| *B01D 29/11* | (2006.01) |
| *B01D 35/30* | (2006.01) |
| *B01D 29/21* | (2006.01) |

(52) U.S. Cl.
CPC ............ *F02M 37/22* (2013.01); *B01D 29/21* (2013.01); *B01D 2201/0415* (2013.01); *B01D 2201/316* (2013.01); *B01D 2201/4076* (2013.01)

(58) Field of Classification Search
CPC .. F02M 37/22; B01D 29/21; B01D 2201/316; B01D 2201/0415; B01D 2201/4076; B01D 2201/291; B01D 2201/301; B01D 2201/304; B01D 2201/34

USPC ............. 210/437, 457, 450, 493.2, 452
See application file for complete search history.

(56) References Cited

U.S. PATENT DOCUMENTS

| | | | |
|---|---|---|---|
| 2,418,777 | A | 4/1947 | Le Clair |
| 4,786,409 | A | 11/1988 | Miller |
| 5,171,043 | A | 12/1992 | Ronda et al. |
| 5,302,284 | A | 4/1994 | Zeiner et al. |
| 6,283,305 | B1 | 9/2001 | Maeda et al. |
| 6,554,139 | B1 | 4/2003 | Maxwell et al. |
| 6,675,995 | B2 | 1/2004 | Stull et al. |
| 6,797,168 | B1 | 9/2004 | Knight |
| 6,936,084 | B2 | 8/2005 | Schlensker et al. |
| 6,949,189 | B2 | 9/2005 | Bassett et al. |
| 7,147,110 | B2 | 12/2006 | Clausen et al. |
| 7,494,017 | B2 | 2/2009 | Miller |

(Continued)

FOREIGN PATENT DOCUMENTS

| | | |
|---|---|---|
| DE | 197 18 603 A1 | 11/1997 |
| DE | 100 52 524 | 4/2002 |

(Continued)

OTHER PUBLICATIONS

International Search Report and Written Opinion for Patent Application No. PCT/US2014/059713 dated Mar. 16, 2015.

*Primary Examiner* — Madeline Gonzalez
(74) *Attorney, Agent, or Firm* — Renner, Otto, Boisselle & Sklar, LLP

(57) ABSTRACT

Provided is a filter element having an annular resilient sealing device having a bead that undulates axially back and forth for mating with a correspondingly undulating top surface of a base in a filter assembly. The undulating bead provides for a fluid tight seal while restricting relative rotation of the filter element relative to the base.

20 Claims, 6 Drawing Sheets

(56) References Cited

U.S. PATENT DOCUMENTS

| | | |
|---|---|---|
| 7,540,956 B1 | 6/2009 | Kurth et al. |
| 8,603,334 B2 | 12/2013 | Stamey, Jr. et al. |
| 2003/0038088 A1 | 2/2003 | Denys et al. |
| 2004/0103626 A1 | 6/2004 | Warth et al. |
| 2008/0142426 A1 | 6/2008 | Greco et al. |
| 2010/0025317 A1* | 2/2010 | Fall .................. B01D 29/21 210/237 |
| 2010/0064646 A1 | 3/2010 | Smith et al. |
| 2012/0181224 A1* | 7/2012 | Rapin ............... B01D 35/153 210/232 |

FOREIGN PATENT DOCUMENTS

| | | |
|---|---|---|
| JP | 2000 510038 A | 8/2000 |
| WO | 2005/068047 A1 | 7/2005 |
| WO | 2006/012031 | 2/2006 |
| WO | 2009/012010 | 1/2009 |
| WO | 2010/117799 | 10/2010 |

* cited by examiner

FILTER ELEMENT WITH UNDULATING SEAL

RELATED APPLICATIONS

This application claims the benefit of U.S. Provisional Application No. 61/888,302 filed Oct. 8, 2013, which is hereby incorporated herein by reference.

FIELD OF INVENTION

The present invention relates generally to fluid filters and assemblies, and more particularly to a fuel filter and assembly for a vehicle fuel system.

BACKGROUND

In certain fuel systems, such as for vehicles, a pump is provided to move fuel through the system such as from the tank to the engine. A filter element may be provided downstream (on the pressure side) of the pump to protect downstream components. At start-up and during operation of the system, air can be pushed into the filter housing. It is desirable to vent the accumulated air in the housing to avoid the air being pushed through the element. The air can create erratic fuel delivery, and effect performance of the downstream components.

To allow the air to bleed slowly out of the housing as the housing is filled with fuel, a vent orifice may be provided in the upper part of the housing. By sizing the orifice appropriately, and by locating the orifice in the upper part of the housing, the orifice will essentially only allow air to vent out. Any loss of fuel is fairly insignificant and can be collected and directed with the air back to tank.

SUMMARY OF INVENTION

The present invention provides a filter element having an annular resilient sealing device having a bead that undulates axially back and forth for mating with a correspondingly undulating top surface of a base in a filter assembly. The undulating bead provides for a fluid tight seal while restricting relative rotation of the filter element relative to the base.

According to one aspect of the invention, a filter element is provided for a filter head having a standpipe assembly having a standpipe member that extends upwardly from a base having raised and recessed portions. The filter element includes a ring of filtration media having a central axis and defining a central cavity, the ring of filtration media having a first end and a second end, a first end cap sealingly bonded to the first end of the ring of filtration media, a second end cap sealingly bonded to the second end of the ring of filtration media, a support core disposed in the central cavity of the ring of filtration media between the first and second end caps and interiorly supporting the ring of filtration media, and an annular resilient sealing device carried by the second end cap and bounding a central opening in the second end cap, the annular resilient sealing device having a plurality of axially outwardly raised portions circumferentially spaced apart by recessed portions, whereby when the filter element is assembled to the standpipe assembly, the raised portions on the filter element mate with the recessed portions on the standpipe base The raised portions and recessed portions protrude radially inwardly from an inner surface of the annular resilient sealing portion.

The raised portions and the recessed portions are defined by an annular undulating bead.

The annular resilient sealing device further includes a radially inwardly protruding bead axially spaced from the raised portions and recessed portions for sealing to an outer wall of the standpipe member.

The radially inwardly protruding bead is formed on the inner surface of the annular resilient sealing portion.

The annular resilient sealing device further includes a radially outwardly protruding bead axially spaced from the raised portions and recessed portions for sealing to an inner wall of the support core.

The radially outwardly protruding bead is formed on an outer surface of annular resilient sealing portion.

The annular resilient sealing device further includes a plurality of circumferentially spaced through-passages for allowing fluid flow from the support core to a cavity formed between the base and the standpipe member.

The through-passages extend through a top and side portion of the annular resilient sealing portion.

The through-passages are circumferentially spaced between adjacent raised portions and each aligned with a respective one of the recessed portions.

The annular sealing device includes an annular top portion, an annular head portion extending upward in the axial direction from the top portion, and an annular skirt wall extending downward in the axial direction from the top portion.

The head portion includes a radially inwardly protruding bead axially spaced from the raised portions and recessed portions for sealing to an outer wall of the standpipe member and a radially outwardly protruding bead axially spaced from the radially inwardly protruding bead for sealing to an inner wall of the support core The radially inwardly protruding bead is formed on an inner surface of the head portion and the radially outwardly protruding bead is formed on an outer surface of head portion.

The annular resilient sealing device further includes a plurality of circumferentially spaced through-passages, each through-passage extending through the top portion and the skirt wall.

The support core has a perforate frame allowing fluid flow passing radially through the ring of filtration media to pass radially through the core into the central cavity.

According to another aspect of the invention, a filter element is provided that includes a ring of filtration media having a central axis and defining a central cavity, the ring of filtration media having a first end and a second end, a first end cap sealingly bonded to the first end of the ring of filtration media, a second end cap sealingly bonded to the second end of the ring of filtration media, a support core disposed in the central cavity of the ring of filtration media between the first and second end caps and interiorly supporting the ring of filtration media, and an annular resilient sealing device carried by the second end cap and bounding the central opening therein, the annular resilient sealing device having a skirt wall extending around an outer periphery of the annular resilient sealing device, an inner surface of the skirt wall having a radially inwardly protruding bead that undulates axially back and forth for mating with a correspondingly undulating top surface of a base of a standpipe assembly.

The annular resilient sealing device further includes a second radially inwardly protruding bead axially spaced from the undulating bead for sealing to an outer wall of the standpipe member.

The second radially inwardly protruding bead is formed on an inner surface of the annular resilient sealing portion.

The annular resilient sealing device further includes a radially outwardly protruding bead axially spaced from the undulating bead for sealing to an inner wall of the support core.

The radially outwardly protruding bead is formed on an outer surface of annular resilient sealing portion.

The annular resilient sealing device further includes a plurality of circumferentially spaced through-passages for allowing fluid flow from the support core to cavity formed between the base and the standpipe member.

Each through-passage extends through a top portion of the annular resilient sealing portion and the skirt wall.

The support core has a perforate frame allowing fluid flow passing radially through the ring of filtration media to pass radially through the core into the central cavity.

According to still another aspect of the invention, a filter assembly is provided that includes a housing including a canister with a closed end and an open end and an inlet port to direct fluid to be filtered into the housing, a cover for the open end of the canister and together therewith defining an internal chamber, a filter element disposed within the internal chamber of the housing, the filter element including a ring of filtration media having a central axis and defining a central cavity, the ring of filtration media having a first end and a second end, a first end cap sealingly bonded to the first end of the ring of filtration media, a second end cap sealingly bonded to the second end of the ring of filtration media, a support core disposed in the central cavity of the ring of filtration media between the first and second end caps and interiorly supporting the ring of filtration media, and an annular resilient sealing device carried by the second end cap and bounding the central opening therein, the annular resilient sealing device having an undulating radially inwardly protruding bead defining a plurality of hills equally circumferentially spaced apart by a plurality of valleys, and a standpipe assembly disposed within the internal chamber of the housing, the standpipe assembly including a base, a standpipe member that extends upward from the base away from the closed end of the canister, and a flow channel defined through the standpipe assembly, wherein the base has an undulating upper surface defining a plurality of hills equally circumferentially spaced apart by a plurality of valleys, wherein the plurality of hills and valleys on the annular resilient sealing device mate with the plurality of hills and valleys on the base of the standpipe assembly, thereby restricting relative rotation of the filter element relative to the base The base of the standpipe assembly includes a groove that receives a seal for sealing to the housing.

The standpipe assembly is secured to the housing by a retainer ring.

The base of the standpipe assembly includes a plurality of circumferentially spaced radially outwardly protruding portions.

The foregoing and other features of the invention are hereinafter described in greater detail with reference to the accompanying drawings.

DETAILED DESCRIPTION

The principles of this present application have particular application to filter assemblies for removing particulates and other contaminants from a fluid system, such as from a fuel stream in a fuel system for a vehicle, and thus will be described below chiefly in this context. It will of course be appreciated, and also understood, that principles of this invention may be applicable to other filter assemblies where it is desirable to remove particulates from a fluid, such as from hydraulic fluid in an aircraft.

Figure 1:
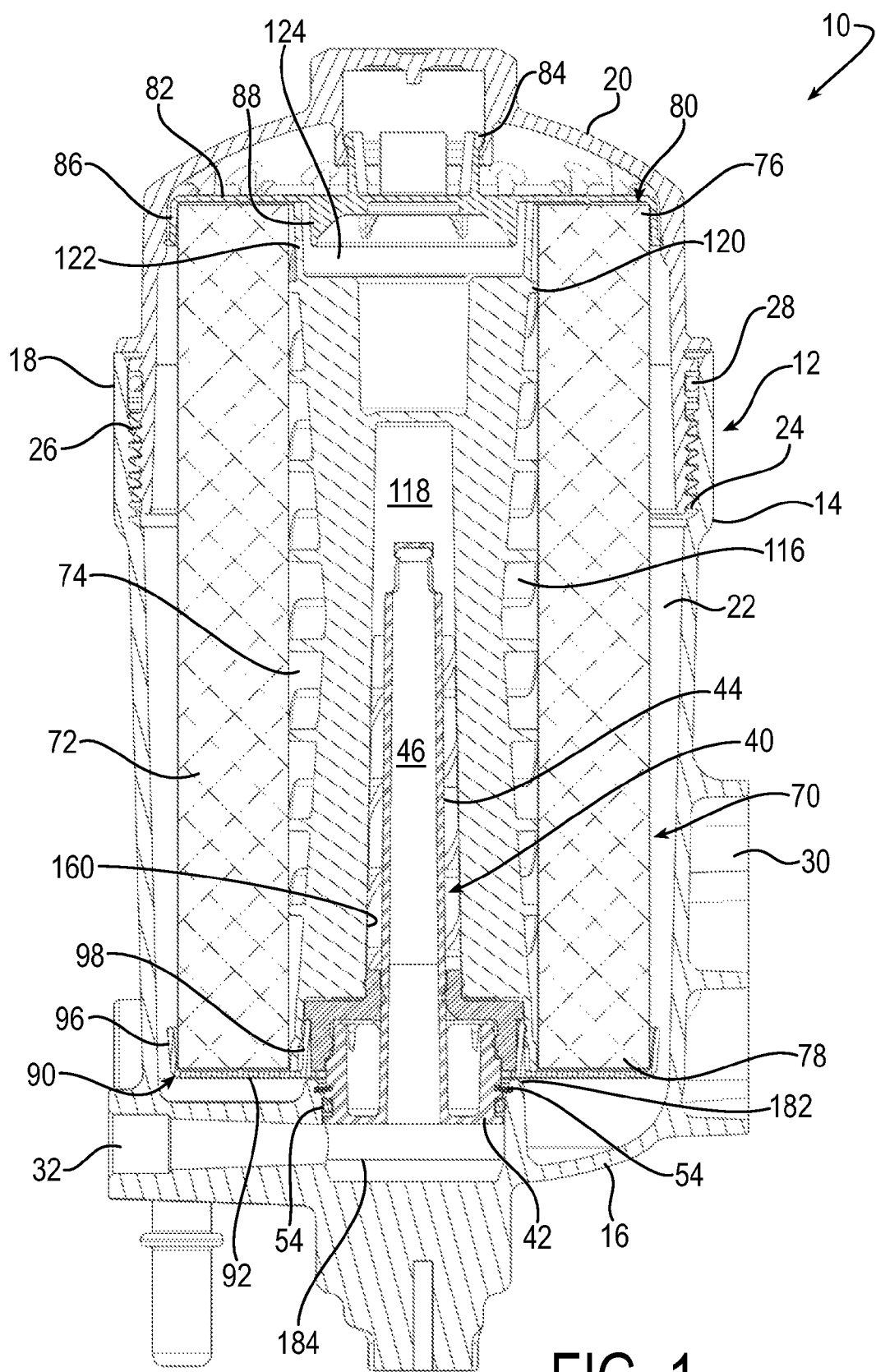
FIG. 1 is a cross-sectional side view of a filter assembly according to the invention.

Referring to the drawings, and initially to FIG. 1, a filter assembly is illustrated generally at reference numeral 10. The filter assembly 10 can be located downstream, on a pressure side of a pump for moving fuel through a fuel system for a vehicle, e.g., from the tank to the engine. It will of course be appreciated that other locations and applications of the filter assembly are possible.

The filter assembly 10 includes a housing 12 comprising a cylindrical canister 14 having a lower, closed end 16 and an upper, open end 18. A cup-shaped cover 20 is attached to the open end 18 of the canister 14, and defines an internal chamber 22 therewith. The canister 14 includes threads 24 that mate with threads 26 on the cover 20 to allow the cover to be screwed onto and off of the canister 14, and a suitable seal 28, such as an o-ring, may be provided to seal the cover 20 to the canister 14. A first port (fuel inlet) 30 is provided, for example, along the side of the canister 14 or in the end wall 16 to direct fuel to be filtered (e.g., from the pump or tank) into the housing 12. A second port (fluid outlet) 32 is provided, for example in the end wall 16 to direct filtered fuel from the housing 12 to a downstream component, e.g., the engine. A third port (drain) is also provided, for example, along the side of the canister 14 to direct air and any associated leaking fuel back to the tank or reservoir. The canister is preferably formed from metal or other appropriate material using conventional processes (e.g., die-casting, machining, etc.).

Figure 2:
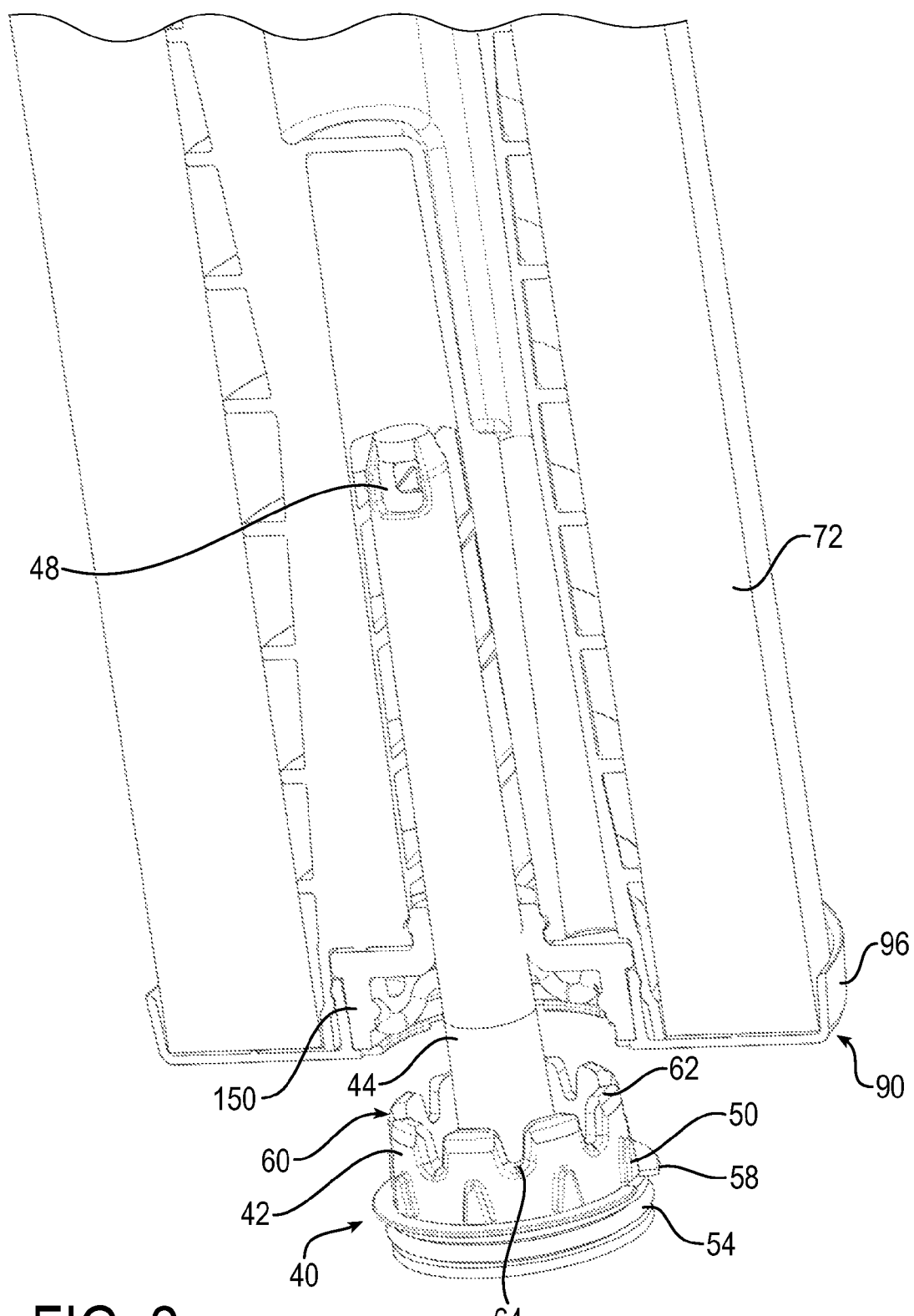
FIG. 2 is a partial cross-sectional view of the exemplary filter element and an exemplary standpipe according to the invention.
Figure 4:
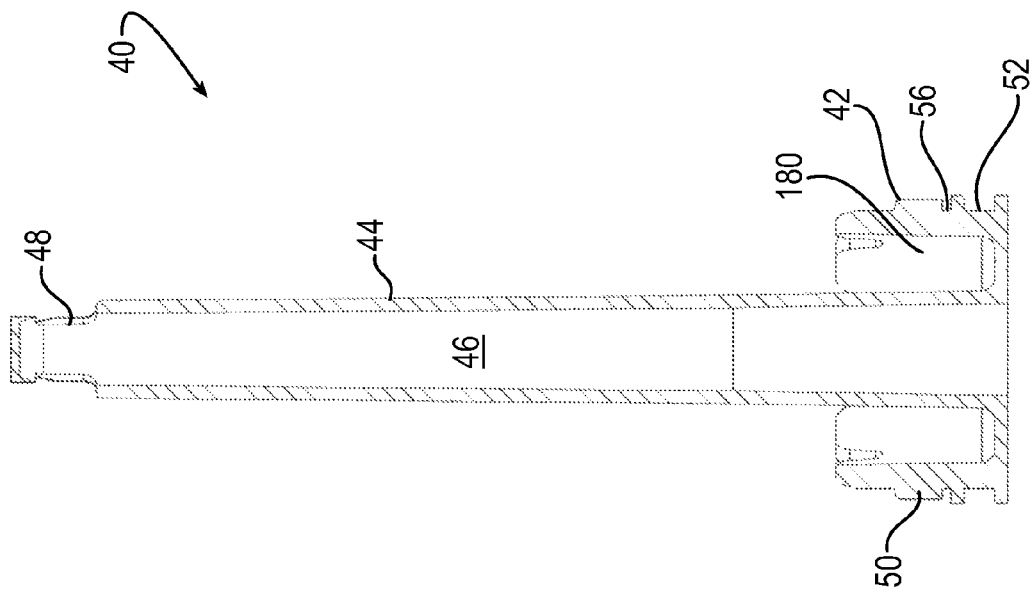
FIG. 4 is a cross-sectional view of the exemplary standpipe taken about line 4-4 in FIG. 3.
Figure 3:
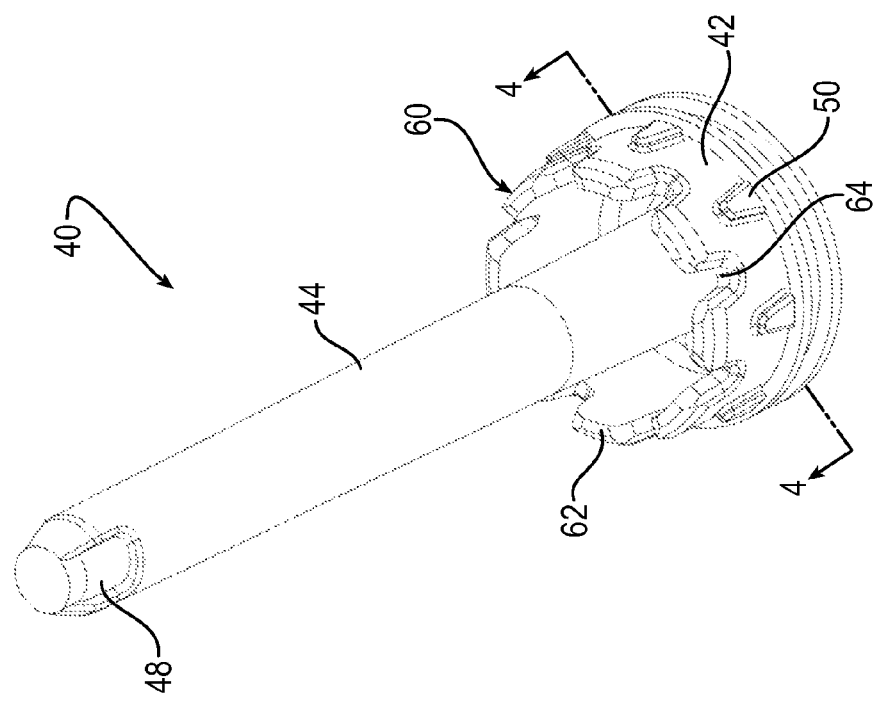
FIG. 3 is a perspective view of the exemplary standpipe.

Referring now also to FIGS. 2-4, a standpipe assembly, indicated generally at 40, is disposed within the internal chamber 22 of the housing 12, and includes a base 42 and an elongated standpipe member 44, centrally located and extending axially upward, away from the closed end 16 of the housing 12 towards the open end 18. The standpipe member 44 includes a flow channel 46 defined through the standpipe member for fluid flow therethrough. The fluid flows through the internal chamber 22 and enters the flow channel 46 via one or more openings 48 at a top portion of the standpipe member 44.

The base 42 may optionally include one or more channels (not shown) in its bottom surface through which the air and any associated leaking fuel flow through to the third port and a plurality of circumferentially spaced radially outwardly protruding portions 50. The protruding portions 50 may be any suitable shape, such as wedge shaped, for aligning a filter element in the chamber 22. The base 42 also includes a seal groove 52 for receiving a suitable seal, such as o-ring 54 for sealing the base 42 to the closed end 16 of the housing 12. To fixedly attach the standpipe assembly 40 to the closed end 16, the base 42 includes an annular slot 56 formed between a bottom of the protruding portions 50 and a top of the seal groove 52 for receiving a suitable retainer 58, such as a retainer ring.

As will be discussed in more detail below, the base 42 also includes an undulating upper surface 60 defining a plurality of raised portions 62 (or hills) equally circumferentially spaced apart by a plurality of recessed portions 64 (or valleys) for mating with a corresponding undulating bead of a filter element. The raised portions 62 are axially aligned with the protruding portions 50 such that each raised portion 62 has below it a corresponding protruding portion 50.

The base 42 and standpipe member 44 are preferably formed from a conventional material, such as metal or plastic, in one piece (unitary), with the channels being created during the forming process. It is also possible that the standpipe assembly could be formed from multiple pieces fixed together. For example, the standpipe member 44 could be formed in one piece and attached (such as with adhesive or press-fit) to the base 42. It is further possible that all or a portion of the standpipe assembly 40 could be formed in one piece (unitary) with the end wall 16.

Figure 5:
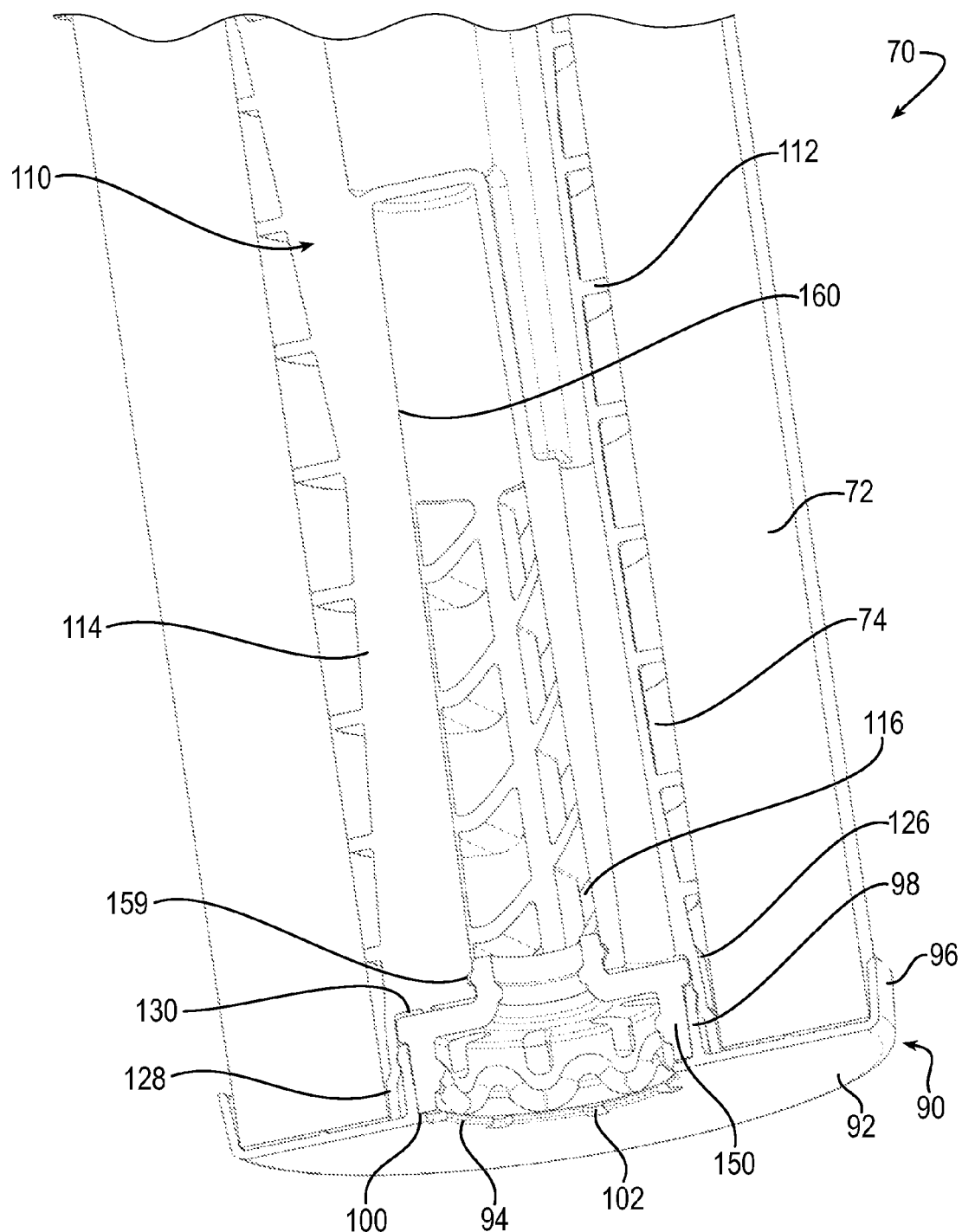
FIG. 5 is a partial cross-sectional view of an exemplary filter element according to the invention.
Figure 6:
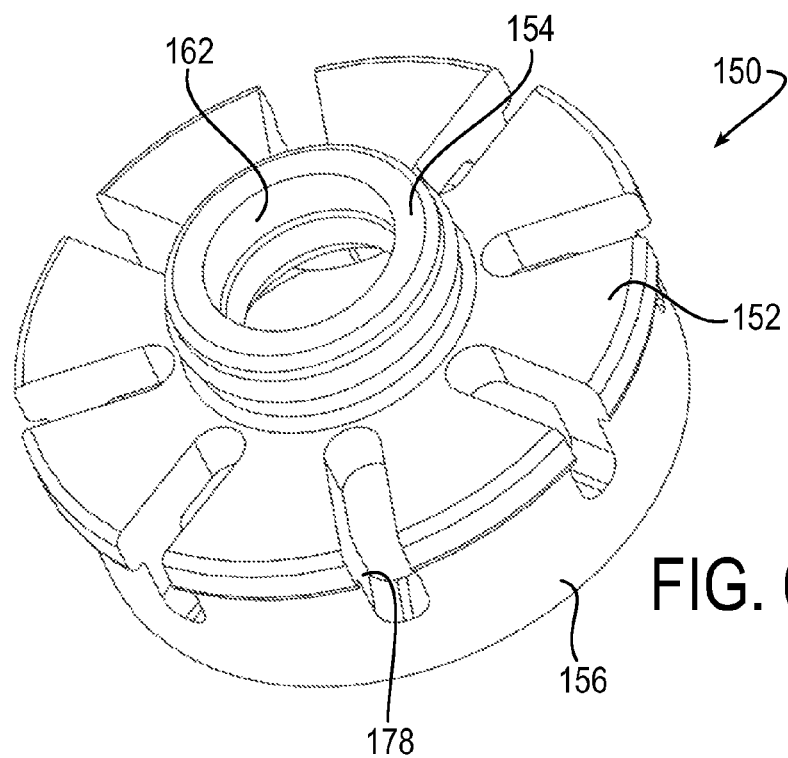
FIG. 6 is a top perspective view of an exemplary annular sealing device according to the invention.
Figure 7:
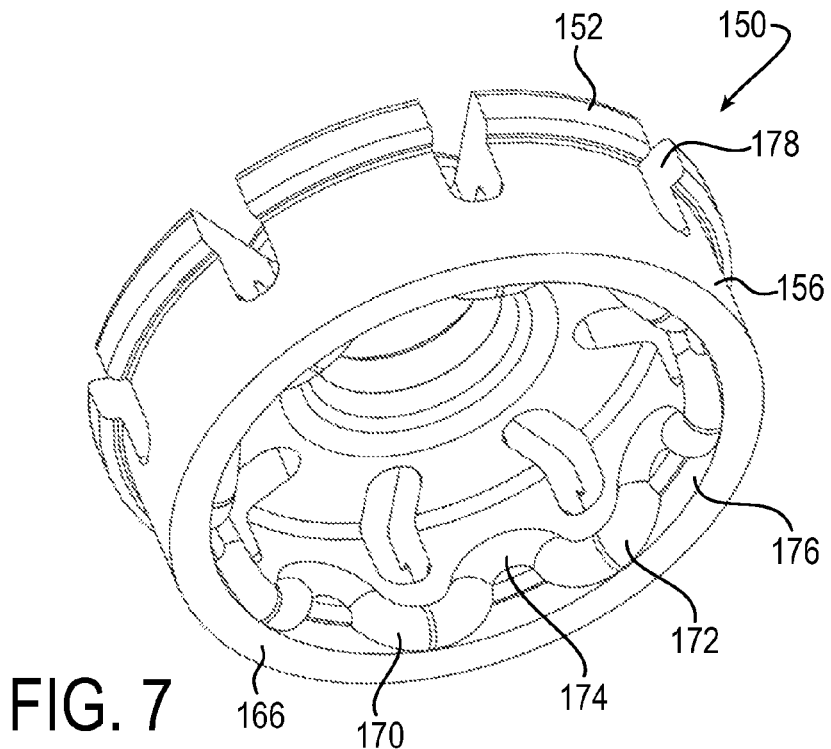
FIG. 7 is a bottom perspective view of the exemplary annular sealing device.
Figure 8:
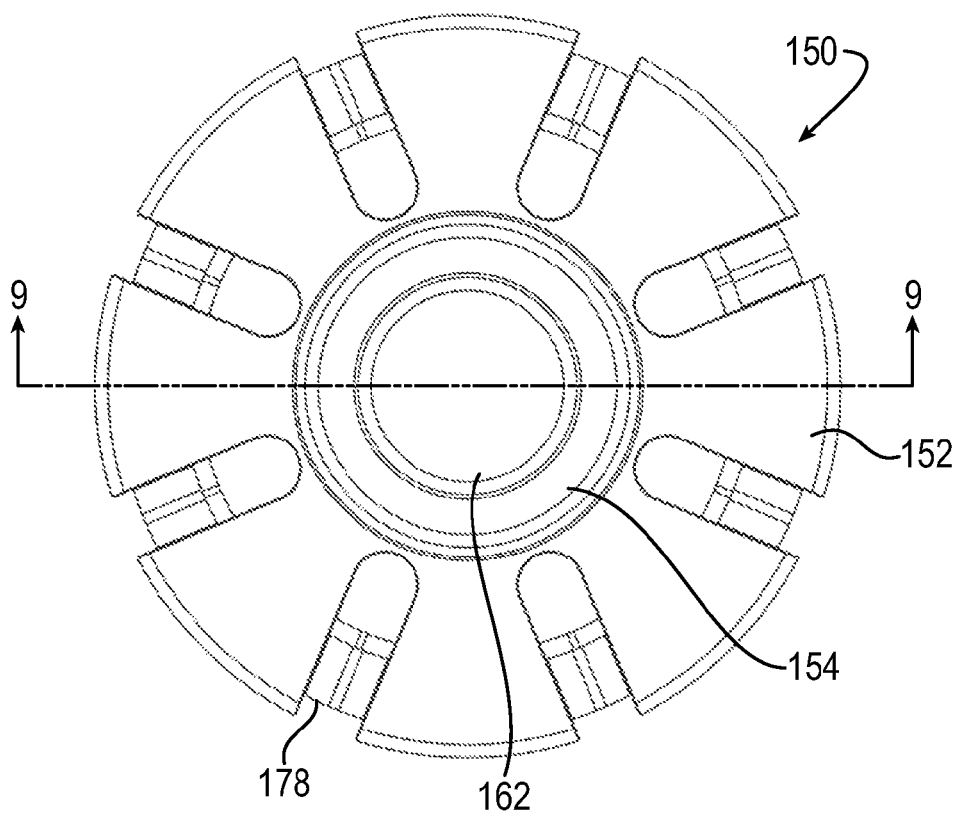
FIG. 8 is a top view of the exemplary annular sealing device.
Figure 9:
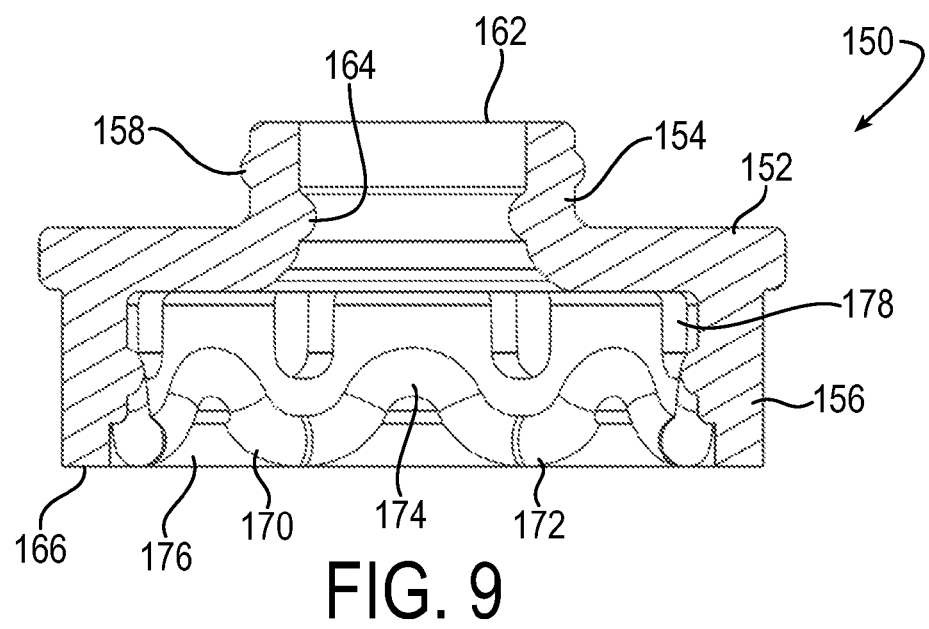
FIG. 9 is a cross-sectional view of the exemplary annular sealing device taken about line 9-9 in FIG. 8.

Referring now to FIGS. 1, 2 and 5, the filter assembly 10 further includes a filter element, indicated generally at 70, located internally of the housing 12. The element 70 includes a ring of filtration media 72 having a central axis and defining a central cavity 74, and has a first, upper end 76 and a second, lower end 78. The ring of filtration media 72 is formed from a material having an efficiency and structure (pleated, blown, etc.) appropriate for the particular application.

The filter element also includes a first end cap 80 that includes a circular body portion 82, and is sealingly bonded, for example by a suitable potting compound to the first end 76 of the media ring 72. A plurality of flexible fingers 84 can be provided on the outer surface of the body portion 82 and project axially upward/outwardly therefrom, for temporary locking engagement with appropriate geometry (tabs, grooves, etc.) on the inside surface of the cover 20. A short annular skirt 86 extends around the outer periphery of the first end cap 80 and projects a short distance from the first end cap 80 towards the second end 78 of the media ring 72, to outwardly bound and support the media ring 72. A short annular collar 88 extends axially inwardly (downwardly) from the inner surface of the body portion 82 into the central cavity 74 of the media ring. A vent orifice (not shown) may be provided in the body portion 82 of the end cap, for example along the central axis of the media ring 72 or radially inward from the media ring 72. While shown as being formed in one piece (unitary), the first end cap 80 may be formed in multiple pieces, and may be formed using conventional processes from any suitable material, such as plastic.

The filter element additionally includes a second end cap 90 that includes an annular body portion 92 defining a central opening 94, and is sealingly bonded, for example by a suitable potting compound to the second end 78 of the media ring 72. A short annular skirt 96 extends around the outer periphery of the second end cap 90 and projects a short distance from the second end cap 90 towards the first end cap 80, to also outwardly bound and support the media ring 72. A short annular collar 98 extends axially inwardly/upwardly from the inner surface of the second end cap 90, into the central cavity 74 of the media ring 72. The annular body portion 92 and collar 98 define an annular shoulder 100, projecting radially inwardly from the collar 98 and bounding the central opening 94. The second end cap also includes a plurality of circumferentially spaced slots 102 in the wall of the annular body portion 92 forming the opening 94. Each slot 102 receives one of the protruding portions 50 when the filter element 70 is inserted into the canister 14 to align the bottom end cap 90 in the canister 14. While shown as being formed in one piece (unitary), the second end cap 90 may be formed in multiple pieces, and may be formed using conventional processes from any suitable material, such as plastic.

The filter element also includes a central core 110 received internally of the media ring 72 to provide support for the media ring. The support core 110 extends along the entire length of the media ring 72 and includes a cylindrical frame having a series of annular, lateral support members as at 112; and a series of axial, longitudinal support members as at 114, with support members 112 and 114 defining a series of radial flow openings as at 116. Fluid enters a central cavity 118 in the support core via the openings 116 and then enters the standpipe member via the opening 48. The lateral support members 112 have an outer dimension sufficient to engage and support an inner dimension of media ring 72, and an inner dimension sufficient to receive the standpipe member 46.

The uppermost lateral support member 120 has a circular configuration, and includes an annular collar 122 bounding the periphery thereof and projecting outwardly (upwardly) therefrom. The collar 122 is dimensioned to be received between the collar 88 of first end cap 80 and media ring 72, and is sealingly bonded to the first end cap 80 in any suitable manner, such as by the potting compound when the first end cap 80 is fixed to the media ring 72. When so assembled, a first, upper circular chamber 124 in communication with a vent opening (not shown) is defined between the uppermost lateral support member 120 and the first end cap 80.

Similarly, the lowermost lateral support member 126 has an annular configuration and includes an annular collar 128 bounding the periphery thereof and projecting outwardly (downwardly) therefrom. The collar 128 is dimensioned to be received between the collar 98 of the second end cap 90 and the media ring 72, and is sealingly bonded to the second end cap 90 in any suitable manner, such as by the potting compound when the second end cap 90 is fixed to the media ring 72. A second, lower annular chamber 130 is defined between the lower-most lateral support member 126 and the second end cap 90.

The support core 110 may be formed in one piece (unitary) from any suitable material, such as plastic, using conventional processes, and as described previously, may be fixed to first and second end caps 80 and 90 by embedding the collars 122 and 128 in the potting compound at the ends 76 and 78 of the filter media 72. The number of support members 112 and 114 can vary depending on the strength requirements and the desired flow through the assembly, and the support core 110 may have other suitable configurations, such as a cylindrical perforated tube. Alternatively, the media ring 72 may have sufficient internal support such that the core may not include the support members.

Turning now to FIGS. 5-9, the filter element 70 also includes an annular resilient sealing device 150 carried by the second end cap 90 and bounding the central opening 94 therein. The annular sealing device 150 includes an annular top portion 152, an annular head portion 154 extending upward in the axial direction from the top portion 152, and an annular skirt wall 156 extending downward in the axial direction from the top portion 152.

The head portion 154 has an outer dimension such that it can be inserted into the cavity 118 and the top portion 152 has an outer dimension such that it can be received internally of the lowermost lateral support member 126. The head portion 154 includes a radially outwardly protruding bead 158 that is received in a sealing groove 159 in an inner wall 160 of the support core 110 that defines the cavity 118 to seal against the inner wall 160, and an opening 162 that receives the standpipe member 44.

Similarly, the head portion 154 includes a radially inwardly protruding bead 164 that seals against an outer wall of the standpipe member 44 when the filter element 70 is installed in the housing 12. The radially outwardly protruding bead 158 is formed on an outer surface of the head portion 154 and the radially inwardly protruding bead 164 is formed on an inner surface of the head portion 154. The beads 158 and 164 are shown axially spaced from one another, although it will be appreciated that the beads may be aligned with one another. It will also be appreciated that the radially inwardly protruding bead 164 may be formed on an inner surface of the top portion 152 or the skirt wall 156.

The skirt wall 156 has a flat lower surface 166, and an outer dimension sufficient to fit closely within the collar 98 of the second end cap 90 and against the shoulder 100. The skirt wall 156 also has an annular undulating bead 170 that undulates axially back and forth for mating with a correspondingly undulating top surface of the base 42. The annular undulating bead 170 defines a plurality of axially outwardly raised portions 172 (or hills) that are equally circumferentially spaced apart by recessed portions 174 (or valleys). The annular raised portions 172 and recessed portions 174 mate with the recessed portions 64 and raised portions 62 on the base 42 of the standpipe assembly 40 when the filter element 70 is assembled to the standpipe assembly 40 thereby restricting relative rotation of the filter element 70 relative to the base 42. The raised portions 172 and recessed portions 174 protrude radially inwardly from an inner surface of the annular resilient sealing portion 150, and as shown from an inner surface 176 of the skirt wall 156.

The annular sealing device 150 also includes at least one, and as shown a plurality of circumferentially spaced through-passages 178 for allowing fluid flow from the support core 110 to a cavity 180 formed between the base 42 and the standpipe member 44. The through-passages 178 extend through the top portion 152 and the skirt wall 156, and as shown are in the form of continuous slots that are substantially L-shaped. The through-passages 178 are circumferentially spaced between adjacent recessed portions 174 and each through-passage 178 is aligned with a respective one of the recessed portions 172. Air and leaking fuel flows from the support core 110 through the through-passages 178 into the cavity 180, and then through the one or more channels (not shown) in the standpipe base 42 to the third port (not shown).

When the filter element 70 is being installed in the housing 12, the standpipe member 44 is inserted into the opening 162 in the head portion 154, and the filter element 70 is advanced until the raised portions 172 and recessed portions 174 mate with the recessed portions 64 and raised portions 62 on the base 42 and the slots 102 are aligned with respective protruding portions 50. At this point, a bottom of the bottom end cap 90 will abut axially upwardly extending portion of the closed end 16 of the canister 14.

Once the filter element is installed and fluid to be filtered is introduced through the inlet port 30, the fluid flows around the periphery of the filter element 70, and radially-inward through the media ring 72, where particulates and other contaminants are separated. The clean fluid then passes through the openings 116 in the support core 110, and up and around the distal end of standpipe member 44, where the fluid then enters the opening 48 and passes down through the channel 46 in the standpipe member. The clean fluid then flows from the channel 46 to a channel 184 in the closed end 16 of the canister 14 and to the outlet port 32.

As should be appreciated, the sealing device 150 fluidly-separates the incoming, dirty fluid from inlet port 30 passing radially-inward through the media ring 72, from the clean fluid on the downstream side of the media ring flowing through the channel 46 in the standpipe member 44. The sealing device 150 also fluidly-separates the air and leaking fuel from the flow passing through the media ring 72 into the channel 46. The sealing device 150 provides for fluidly sealing the device appropriately to the standpipe member 44 while restricting relative rotation of the filter element 70 relative to the base 42. The configuration of the standpipe member 44 and the sealing device 150 also facilitates axially locating the filter element 70 along the standpipe member 44 as discussed above.

The sealing device 150 may be made of any suitable material, such as a resilient or pliant material appropriate for the particular application, such as an elastomeric material. The sealing device 150 is formed in one piece (unitary), and therefore the undulating seal 170 is self supporting and a supporting seal gland is not required. It will be appreciated, however, that the device may be formed of multiple pieces connected to each other in any suitable manner. If formed of multiple pieces, portions of the sealing device 150 could be formed of relatively rigid materials, as long as appropriate portions of the sealing device were resilient to provide for sealing.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter element for a filter head having a standpipe assembly having a standpipe member that extends upwardly from a base having raised and recessed portions, the filter element including:
   a ring of filtration media having a central axis and defining a central cavity, the ring of filtration media having a first end and a second end;

a first end cap sealingly bonded to the first end of the ring of filtration media;

a second end cap sealingly bonded to the second end of the ring of filtration media;

a support core disposed in the central cavity of the ring of filtration media between the first and second end caps and interiorly supporting the ring of filtration media; and an annular resilient sealing device carried by the second end cap and bounding a central opening in the second end cap, the annular resilient sealing device having a plurality of axially outwardly raised portions circumferentially spaced apart by recessed portions, the raised portions and recessed portions protruding radially inwardly from an inner surface of the annular resilient sealing device, whereby when the filter element is assembled to the standpipe assembly, the raised portions on the filter element can mate with the recessed portions on the standpipe base thereby restricting relative rotation of the filter element relative to the standpipe base.

2. The filter element according to claim 1, wherein the raised portions and the recessed portions are defined by an annular undulating bead.

3. The filter element according to claim 1, wherein the annular resilient sealing device further includes a radially inwardly protruding bead axially spaced from the raised portions and recessed portions for sealing to an outer wall of the standpipe member.

4. The filter element according to claim 3, wherein the radially inwardly protruding bead is formed on the inner surface of the annular resilient sealing portion.

5. The filter element according to claim 1, wherein the annular resilient sealing device further includes a radially outwardly protruding bead axially spaced from the raised portions and recessed portions for sealing to an inner wall of the support core.

6. The filter element according to claim 5, wherein the radially outwardly protruding bead is formed on an outer surface of annular resilient sealing portion.

7. The filter element according to claim 1, wherein the annular resilient sealing device further includes a plurality of circumferentially spaced through-passages for allowing fluid flow from the support core to a cavity formed between the base and the standpipe member.

8. The filter element according to claim 7, wherein the through-passages extend through a top and side portion of the annular resilient sealing portion.

9. The filter element according to claim 7, wherein the through-passages are circumferentially spaced between adjacent raised portions and each aligned with a respective one of the recessed portions.

10. The filter element according to claim 1, wherein the annular sealing device includes an annular top portion, an annular head portion extending upward in the axial direction from the top portion, and an annular skirt wall extending downward in the axial direction from the top portion.

11. The filter element according to claim 10, wherein the head portion includes a radially inwardly protruding bead axially spaced from the raised portions and recessed portions for sealing to an outer wall of the standpipe member and a radially outwardly protruding bead axially spaced from the radially inwardly protruding bead for sealing to an inner wall of the support core.

12. The filter element according to claim 11, wherein the radially inwardly protruding bead is formed on an inner surface of the head portion and the radially outwardly protruding bead is formed on an outer surface of head portion.

13. The filter element according to claim 10, wherein the annular resilient sealing device further includes a plurality of circumferentially spaced through-passages, each through-passage extending through the top portion and the skirt wall.

14. The filter element according to claim 1, wherein the support core has a perforate frame allowing fluid flow passing radially through the ring of filtration media to pass radially through the core into the central cavity.

15. The filter element according to claim 1, wherein the support core extends between and interconnects the first and second end caps.

16. A filter element including:
a ring of filtration media having a central axis and defining a central cavity, the ring of filtration media having a first end and a second end;

a first end cap sealingly bonded to the first end of the ring of filtration media;

a second end cap sealingly bonded to the second end of the ring of filtration media;

a support core disposed in the central cavity of the ring of filtration media between the first and second end caps and interiorly supporting the ring of filtration media; and an annular resilient sealing device carried by the second end cap and bounding a central opening therein, the annular resilient sealing device having a skirt wall extending around an outer periphery of the annular resilient sealing device, an inner surface of the skirt wall having a first radially inwardly protruding bead that undulates axially back and forth for mating with a correspondingly undulating top surface of a base of a standpipe assembly.

17. The filter element according to claim 16, wherein the annular resilient sealing device further includes a second radially inwardly protruding bead axially spaced from the first radially inwardly protruding bead for sealing to an outer wall of a standpipe member.

18. The filter element according to claim 17, wherein the second radially inwardly protruding bead is formed on an inner surface of the annular resilient sealing device.

19. The filter element according to claim 16, wherein the annular resilient sealing device further includes a radially outwardly protruding bead axially spaced from the first radially inwardly protruding bead for sealing to an inner wall of the support core.

20. A filter assembly including:
a housing including a canister with a closed end and an open end and an inlet port to direct fluid to be filtered into the housing;

a cover for the open end of the canister and together therewith defining an internal chamber;

a filter element disposed within the internal chamber of the housing, the filter element including:
a ring of filtration media having a central axis and defining a central cavity, the ring of filtration media having a first end and a second end;

a first end cap sealingly bonded to the first end of the ring of filtration media;

a second end cap sealingly bonded to the second end of the ring of filtration media;

a support core disposed in the central cavity of the ring of filtration media between the first and second end caps and interiorly supporting the ring of filtration media; and an annular resilient sealing device carried by the second end cap and bounding a central opening therein, the annular resilient sealing device having an undulating radially inwardly protruding bead defining a plurality of hills equally circumferentially spaced apart by a plurality of valleys; and a standpipe assembly disposed within the internal chamber of the housing, the standpipe assembly including a base, a standpipe member that extends upward from the base away from the closed end of the canister, and a flow channel defined through the standpipe assembly, wherein the base has an undulating upper surface defining a plurality of hills equally circumferentially spaced apart by a plurality of valleys, wherein the plurality of hills and valleys on the annular resilient sealing device mate with the plurality of hills and valleys on the base of the standpipe assembly, thereby restricting relative rotation of the filter element relative to the base.

* * * * *